United States Patent [19]

Guiler et al.

[11] Patent Number: 4,588,218
[45] Date of Patent: May 13, 1986

[54] SECURITY SEAL

[75] Inventors: Richard S. Guiler, Newton; Peter Farbaniec, Colonia, both of N.J.

[73] Assignee: E. J. Brooks Company, Newark, N.J.

[21] Appl. No.: 546,952

[22] Filed: Oct. 31, 1983

[51] Int. Cl.$^4$ ............................................. G09F 3/00
[52] U.S. Cl. ............................... 292/307 R; 24/16 PB; 292/318; 403/405.1
[58] Field of Search ................... 292/318, 319–322, 292/307 A, 307 B, 307 R; 24/16 PB, 662, 682; 403/405.1, 406.1, 407.1

[56] References Cited

U.S. PATENT DOCUMENTS

| 619,704 | 2/1899 | Brooks | 292/318 |
|---|---|---|---|
| 696,003 | 3/1902 | Brooks | 292/318 |
| 719,642 | 2/1903 | Brooks | 292/318 |
| 848,879 | 4/1907 | Brown | 292/318 |
| 1,144,792 | 6/1915 | Romberger | 292/319 |
| 1,421,714 | 7/1922 | Puc | 292/318 |
| 1,553,188 | 9/1925 | Sauton | 292/318 |
| 2,295,444 | 9/1942 | Woodward | 292/DIG. 38 |
| 2,530,899 | 11/1950 | Mueller | 292/307 R |
| 3,892,013 | 7/1975 | Gould | 24/108 X |
| 3,895,732 | 7/1975 | Robinson et al. | 411/520 |
| 3,966,246 | 6/1976 | Muller, Jr. et al. | 292/318 |
| 4,059,300 | 11/1977 | Moberg et al. | 292/322 |
| 4,082,336 | 4/1978 | Natkins | 292/318 |
| 4,460,203 | 7/1984 | Moberg et al. | 292/318 |

Primary Examiner—Robert L. Wolfe
Assistant Examiner—Lloyd A. Gall
Attorney, Agent, or Firm—Robert E. Ross

[57] ABSTRACT

A seal of the type having a housing with internal resilient fingers for receiving a shouldered stud in locking engagement. The housing is generally cylindrical with a closed end and an open end. In one embodiment of the invention a separate member carrying the resilient fingers is secured into the open end of the housing. In another embodiment of the invention a cylindrical metallic member having an open end and a closed end is retained in the housing behind the member carrying the resilient fingers so that access to the fingers to release the stud cannot be had by cutting off the end of the plastic housing, and the fingers cannot be manipulated by the insertion of a needle or other sharp instrument through the exterior of the housing.

1 Claim, 9 Drawing Figures 4,588,218

SECURITY SEAL

BACKGROUND OF THE INVENTION

In U.S. Pat. No. 4,059,300 there is disclosed a seal formed of plastic, comprising a housing open at the front end and closed at the rear end, with internal resilient fingers extending from the rear end, and a shackle carrying a stud on the remote end which is shaped and dimensioned for nonremovable engagement with the fingers. To assist in preventing access to the fingers and preventing release of the stud from the housing by forcing the stud laterally in the housing to effect release of the fingers with a suitable pick, a separate plastic piece in the form of a collar is assembled into the housing. The seal is manufactured by injection molding the housing, resilient fingers, shackle, and stud as a single piece of material with both ends of the housing being open in the as molded condition, assembling the plastic collar into the rear end of the housing, and then closing the rear end into a dome-shaped configuration by heated dies.

Although the seal disclosed and claimed in said patent has achieved considerable commercial success and is used in many applications, it has been found difficult to reliably close the rear end of the housing in high speed volume production. Also, such closing operation can leave a visible ring around the rear end of the housing which can obscure a cut made on this line by an unauthorized person tampering with the seal.

Also, the dimensions of the locking fingers must be very accurate to insure proper locking of the stud into the fingers, however the required dimensions of the fingers are difficult to maintain in the molding operation, since the fingers are at the end of the shackle, and therefore part of a much larger piece of plastic.

SUMMARY OF THE INVENTION

This invention provides a seal of the type having a housing with an aperture having internal resilient fingers to receive a shouldered stud in locking non-removable engagement. The housing, the shackle, and the stud are molded as a single piece of material, with the housing having an open front end and a closed rear end.

A separately molded unit carrying the resilient fingers is mounted into the front end of the housing and retained therein by heat sealing or other suitable means.

In one embodiment of the invention a metallic cylinder member is assembled into the housing, said member having a closed end positioned adjacent to the closed end of the housing and an open end recessed within the open end of the housing. The metallic cylinder may be press fitted into the housing, or the open end of the cylinder may be provided with a radial flange which seats on an internal shoulder of the housing. In another embodiment of the invention the metallic member may be retained in the housing by the finger unit.

DESCRIPTION OF THE ILLUSTRATED EMBODIMENTS

Figure 1:
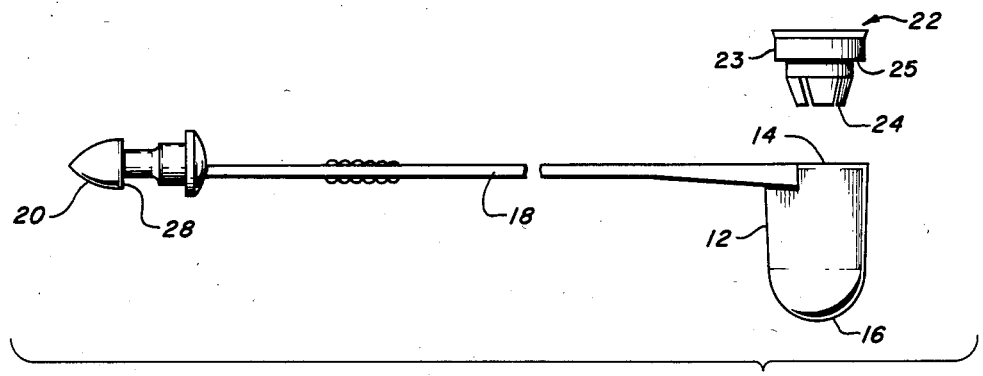
FIG. 1 is a view in side elevation of the components of a seal embodying the features of the invention, shown prior to assembly.
Figure 2:
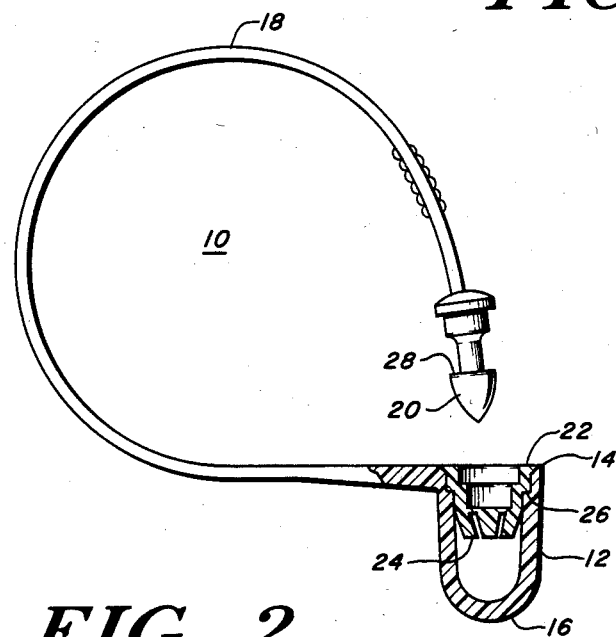
FIG. 2 is a view in side elevation, partly in section, of a seal comprising the components of FIG. 1.
Figure 3:
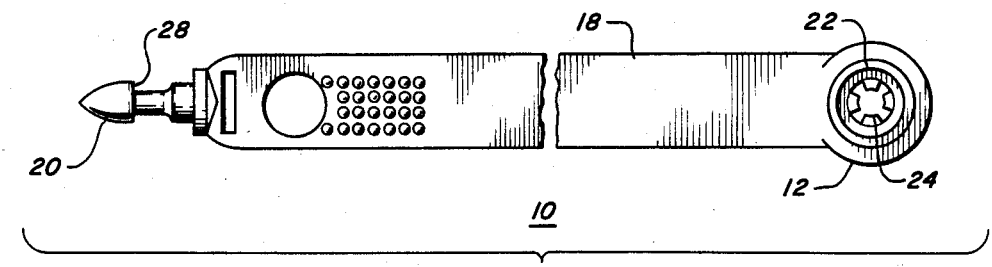
FIG. 3 is a plan view of a seal comprising the components of FIG. 1.
Figure 4:
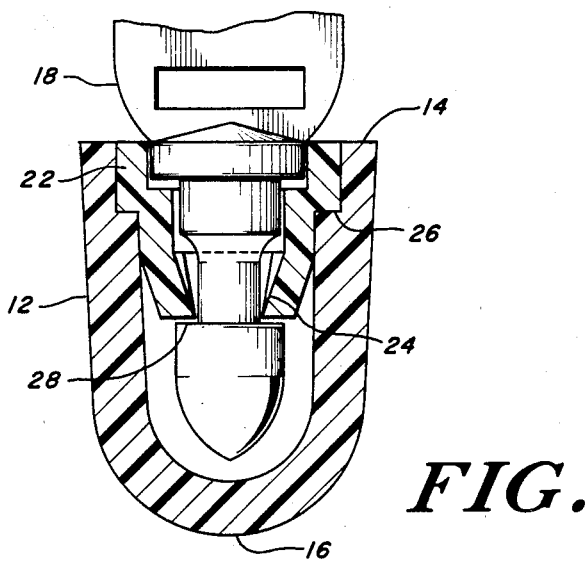
FIG. 4 is an enlarged view in section of the socket portion of the seal of FIGS. 2 and 3.

Referring to FIGS. 1-3 of the drawing, there is illustrated a security seal 10, which comprises a housing 12 having an open front end 14 and a closed rear end 16, a shackle 18 integral with the housing, and a stud 20 disposed on the end of the shackle.

In the illustrated embodiments the housing, shackle, and stud are formed of a single piece of injection molded plastic. To provide means in the housing to receive the stud in locking engagement, a separate locking member 22 is provided, which comprises a support ring 23 and a group of resilient fingers 24 extending therefrom. The fingers are set inwardly from the periphery of the support ring to form a shoulder 25 dimensioned to seat against an internal shoulder 26 in the housing, where it may be retained in any convenient manner such as by heat sealing or an adhesive.

The fingers 24 are inclined inwardly so that the ends thereof form an entrance so dimensioned that the stud 20 can pass therethrough with outward flexing of the fingers, with the fingers snapping behind a stud shoulder 28.

The provision of a separate locking member, which is molded separately from the rest of the seal, has the advantage of allowing more accurate control of the dimensions of the fingers, thus providing a seal with greater security. This procedure also allows the housing 12 to be molded with a closed rear end, rather than molding the housing with an open rear end and then closing said end by heat sealing. The exterior surface of the housing may be uniformly smooth or uniformly textured, so that cuts made in an attempt to open the seal will be clearly visible.

Also, if desired, the locking member may be formed of a different material than the rest of the seal. For example, the main body of the seal (housing, shackle, and stud) may be molded of polyproplyene to allow the necessary flexibility of the shackle, and the locking member may be molded of either the same material or a more brittle material, so that attempts to move the fingers to the unlocking position by inserted probes will cause the fingers to fracture so that if the stud is removed in this manner, it cannot be again locked in the housing.

One method of attempting to open such a seal without leaving evidence of tampering is to cut open the rear end of the seal to obtain access to the locking fingers.

Figure 5:
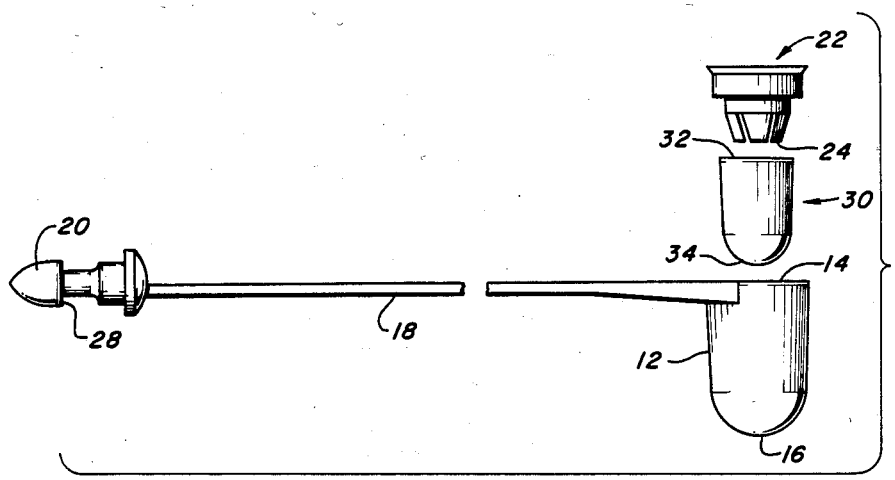
FIG. 5 is a view in side elevation of the components of a modified form of seal embodying the features of the invention.
Figure 6:
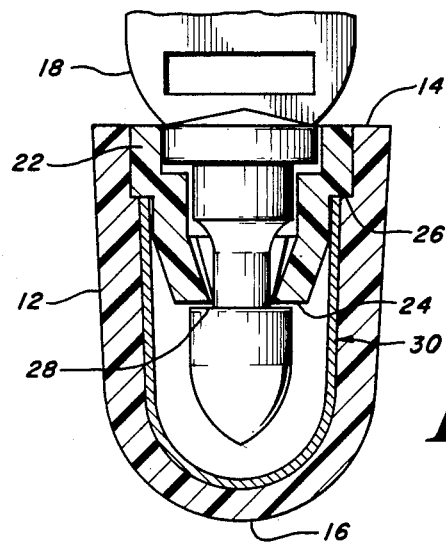
FIG. 6 is an enlarged view in section of the socket of a seal comprising the components of FIG. 5, with the stud assembled therein.

In the embodiment of FIGS. 5 and 6, a metallic cylinder 30 is assembled into the housing, said cylinder conforming generally to the shape of the interior of the housing, and having a closed end and an open end.

The cylinder may be press fitted into the housing, with the inside surface of the housing and the outside surface of the cylinder being slightly tapered so that the open end of the housing and the cylinder are larger than the rear or closed end, thereby preventing removal of the cylinder by cutting away the rear end of the housing.

The presence of the shield prevents the insertion of sharp instruments into the housing to manipulate the fingers in an attempt to release the stud.

Figure 7:
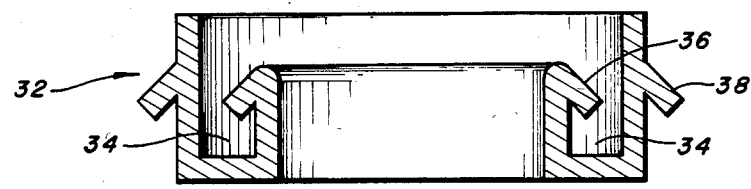
FIG. 7 is a view in side elevation of a collar member used to retain a locking member in a modified form of the invention.
Figure 8:
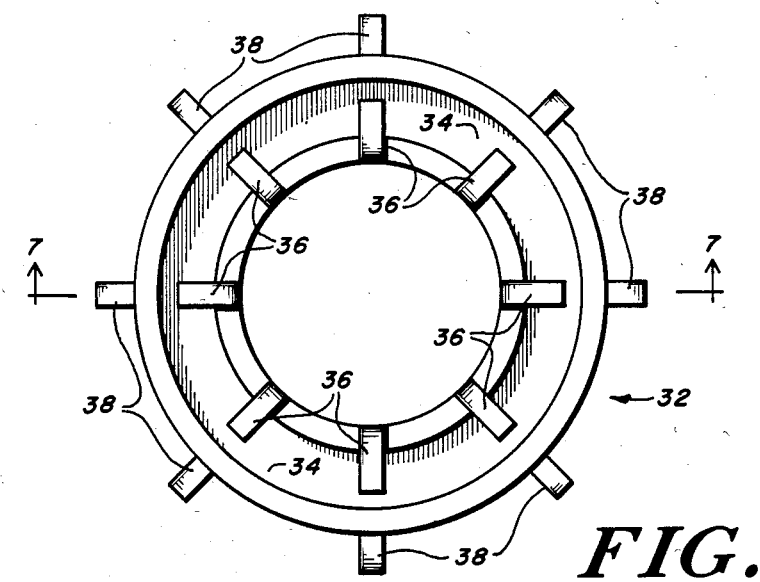
FIG. 8 is a top plan view of the collar of FIG. 7.
Figure 9:
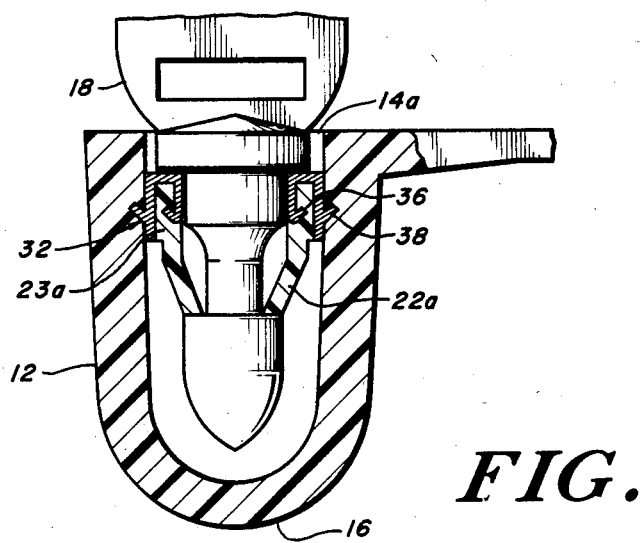
FIG. 9 is a view in side elevation, partly in section, of a modified form of seal utilizing the collar of FIGS. 7 and 8.

Referring to FIG. 7 and 8, there is illustrated a modified form of seal which is similar to the seal of FIG. 1-4, however in the seal of FIGS. 7 and 8, a metal collar 32 is provided which has a circular channel 34, and the locking member 22a has a support ring 23a which is shaped and dimensioned to fit inside the channel 34. Barbs 36 are provided on the collar which protrude into the channel and into the surface of the inserted support ring to retain the support ring in assembly therein. The collar 32 is dimensioned to fit inside the open end 14a of the housing and is retained therein by barbs 38 extending outwardly from the exterior surface of the collar.

The use of the collar 32 allows retention of the locking member 22a in the housing by positive mechanical means, eliminating the need for heat sealing.

Since certain other changes apparent to one skilled in the art may be made in the herein described embodiments of the invention without departing from the scope thereof, it is intended that all matter contained herein be interpreted in an illustrative and not a limiting sense.

We claim:

1. A security seal of the type comprising a housing, a shackle extending from the housing, and a stud at the remote end of the shackle, in which said housing has a closed rear end and an open front end, and a separate locking member and a separate locking member retainer in the open end of the housing, said locking member comprising a support collar and a series of resilient fingers extending inwardly from the collar forming an aperture for receiving the stud in locking engagement, said separate retainer being interposed between the housing and the support collar and having means engaging the inner surface of the housing and means engaging the support collar of the locking member whereby the locking member is retained in the housing, said locking member retainer comprises a circular member having external barbs projecting into the interior surface of the housing, a circular channel receiving the support collar of the locking member, and barbs on the interior of the channel projecting into the surface of the support collar.

* * * * *